(12) United States Patent
Song

(10) Patent No.: US 8,172,253 B2
(45) Date of Patent: May 8, 2012

(54) ASSEMBLY OF SEAT UNIT AND CHILD STROLLER

(75) Inventor: Zhenghuan Song, Kunshan (CN)

(73) Assignee: Goodbaby Child Products Co., Ltd., Kunshan (CN)

( * ) Notice: Subject to any disclaimer, the term of this patent is extended or adjusted under 35 U.S.C. 154(b) by 715 days.

(21) Appl. No.: 12/296,092

(22) PCT Filed: Jul. 24, 2006

(86) PCT No.: PCT/CN2006/001826
§ 371 (c)(1),
(2), (4) Date: Oct. 3, 2008

(87) PCT Pub. No.: WO2008/017193
PCT Pub. Date: Feb. 14, 2008

(65) Prior Publication Data
US 2011/0163518 A1    Jul. 7, 2011

(51) Int. Cl.
*B62B 9/00* (2006.01)
(52) U.S. Cl. ........ 280/642; 280/650; 280/657; 280/658; 280/47.38
(58) Field of Classification Search .................... 280/30, 280/642, 643, 647, 648, 649, 650, 657, 658, 280/47.25, 47.38; 297/130
See application file for complete search history.

(56) References Cited

U.S. PATENT DOCUMENTS

| 5,676,386 | A | * | 10/1997 | Huang | 280/30 |
| 5,772,279 | A | * | 6/1998 | Johnson, Jr. | 297/130 |
| 5,794,951 | A | * | 8/1998 | Corley et al. | 280/30 |
| 5,947,555 | A | * | 9/1999 | Welsh et al. | 297/130 |
| 6,070,890 | A | * | 6/2000 | Haut et al. | 280/47.38 |
| 6,331,032 | B1 | * | 12/2001 | Haut et al. | 297/130 |
| 6,695,400 | B2 | * | 2/2004 | Washizuka et al. | 297/130 |
| 6,863,286 | B2 | * | 3/2005 | Eros et al. | 280/47.38 |
| 7,017,921 | B2 | * | 3/2006 | Eros | 280/47.38 |
| 7,513,512 | B2 | * | 4/2009 | Yoshie et al. | 280/47.38 |

* cited by examiner

*Primary Examiner* — Katy M Ebner
(74) *Attorney, Agent, or Firm* — Stephen C. Beuerle; Procopio Cory Hargreaves & Savitch LLP

(57) ABSTRACT

A seat unit and child stroller assembly includes a stroller having a frame, a seat and a safety device connected to the frame for preventing a child seated on the seat from falling off; a seat unit including a seat frame, a connecting means and an operating means mounted on the seat frame, the connecting means comprising a first locking member for locking the seat frame into the safety device and a second locking member for locking the seat frame into any device except the stroller, the first locking member being shiftable between a locking status during which the seat unit and the safety device are interconnected, and an unlocking status during which the seat unit can be removed from the stroller; wherein, the operating means is set to control the first locking member only, making the first locking member shift from locking status to unlocking status.

13 Claims, 10 Drawing Sheets

ASSEMBLY OF SEAT UNIT AND CHILD STROLLER

FIELD OF THE INVENTION

This invention relates to an assembly of seat unit and child stroller.

BACKGROUND OF THE INVENTION

As well known, a seat unit can be mounted on many children products such as strollers, the chasses of the car seats, etc. However, the connection of a seat unit and a children product generally necessitates the employment of a connecting means, which in most cases is complicated and can only be practicable with the assistance of extra components. Using of extra components leads to at least one significant disadvantage, that is, the operator can be easily confused and feel hard to operate. Another disadvantage lies in that, once the seat unit is separated from the child stroller, one has to remove the extra components away when using the child stroller, which will cause great trouble.

SUMMARY OF THE INVENTION

Accordingly, the object of the present invention is to provide an assembly of seat unit and child stroller, the operation of which is simple and convenient.

In order to achieve the object set forth, an assembly of seat unit and child stroller is provided comprising one or more of the following:

a child stroller including a stroller frame, a stroller seat and a safety device connected to the stroller frame for preventing the child from falling off the stroller seat;

a seat unit including a seat frame, a connecting means and an operating means mounted on the seat frame, the connecting means comprising a first locking member for locking the seat frame into the safety device and a second locking member for locking the seat frame into any device except the child stroller, the first locking member being shiftable between a locking status during which and the seat unit and the safety device are interconnected and an unlocking status during which the seat unit can be removed from the child stroller;

said operating means is set to control the first locking member only, making the first locking member shift from locking status to unlocking status;

the first locking member comprises at least one front locking member, at least one pair of side locking members lying at the left and right side of the seat frame respectively. The safety device comprises a front tray or a front arm support lying above the foreside of the stroller seat, a left arm support lying above the left side of the stroller seat and a right arm support lying above the right side of the stroller seat. The seat frame is locked into the front tray or the front arm support by the front locking member and into the left arm support and the right arm support by the pair of side locking members in the locking status;

the front locking member and the pair of side locking members are simultaneously controlled by the operating means;

the seat frame is formed with a front locking hole at its foreside for accommodating at least part of the front locking member. Part of the front locking member shoots out of the front locking hole in the locking status;

a third spring member is mounted between the front locking member and the seat frame, as a result of which the front locking member is in tendency to be in the locking status;

the front locking member is set on the foreside of the seat frame in the manner that it is slidable along the fore-and-aft direction of the seat frame;

it is also suggested that the operating means comprise an operating member that is slidable with respect to the seat frame, a first pulling member with its upper end connected to the operating member, a third pole with its upper end rotatably connected to the first pulling member, the body of the third pole and the seat frame being pivotally connected through a third pivoted axle, the lower end of the third pole pressing tightly against the front locking member, which is shifted from locking position to the unlocking position when the operating member is pulled forward;

both the left and right side of the seat frame are formed with a side locking hole for accommodating at least part of each of the side locking member respectively, both of the side locking members have a part shooting out of the respective side locking hole when in the locking position;

a first spring member is mounted between one side locking member and the seat frame so that the side locking member is in tendency to be in locking status, and a second spring member is mounted between the other side locking member and the seat frame so that this side locking member is also in tendency to be in the locking status;

the two said side locking members are set respectively on the two sides of the seat frame in the manner that they can slide on the seat frame transversely;

the operating means comprises an operating member slidably set with respect to the seat frame, a first pulling member with the upper end connected to the left side of the operating member, a second pulling member with the upper end connected to the right side of the operating member, a first pulling pole with the front end rotatably connected to the lower end of the first pulling member, a second pulling pole with the front end rotatably connected to the lower end of the second pulling member, a first pole pivotally connected to the seat frame through a first pivoted axle, a second pole pivotally connected to the seat frame through a second pivoted axle. The first pulling pole has a first leading slope; the second pulling pole has a second leading slope. The upper end of the first pole and the second pole being rotatably connected to respective side locking member so that the lower end of the first pole presses tightly against the first leading slope making the locking member shift from the locking position into the unlocking position and the lower end of the second pole presses tightly against the second leading slope making the locking member shift from the locking position into the unlocking status;

the relative state of the second locking member and the seat frame in the locking status and that in the unlocking status are identical;

the second locking member is preferably used to lock the seat frame into a chassis mounted on a car;

the rearward of the seat frame is formed with at least one fixed second locking member;

the seat unit further comprises a hand grip with one end of the hand grip pivotally connected to the left side of the seat frame through a fifth pivoted axle and the other end pivotally connected to the right side of the seat frame through a sixth pivoted axle; and/or the seat frame is formed with a left contact portion in its left side and a right contact portion in its right side, both of which press tightly against the child stroller to ensure a stable connection between the child stroller and the seat unit in the locking status.

Compared with the prior art, the present invention has advantages as follows:

The seat frame is locked into the child stroller through the first locking member, which can be shifted from the locking status into the unlocking status with the mere operation of the operating means. When in the unlocking status, the seat unit can be removed from the child stroller making the child stroller usable. The operation during the whole process is simple.

DETAILED DESCRIPTION OF THE PREFERRED EMBODIMENT

Figure 1:
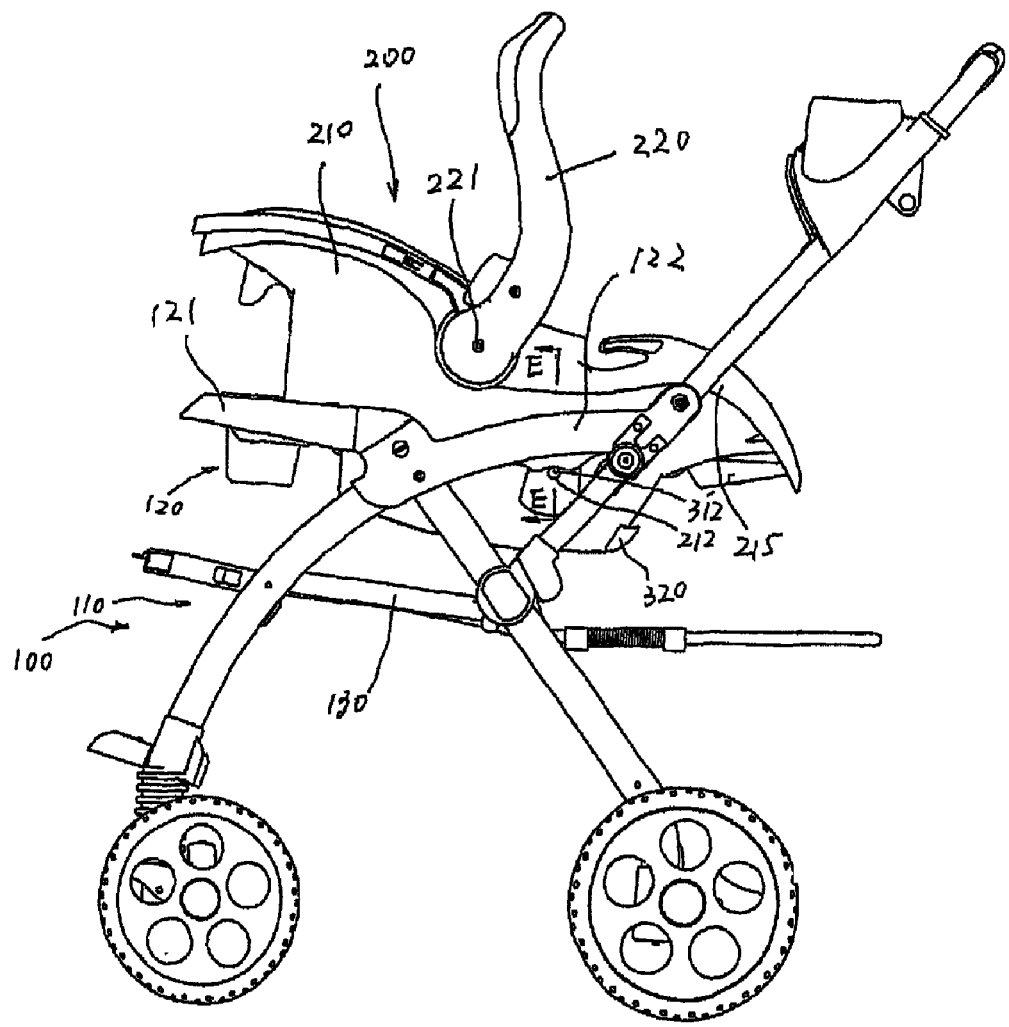
FIG. 1 is a schematic view of the present invention.

An assembly of seat unit and child stroller embodying the principles and concepts of the present invention will be described in detail in the following text.

The invention mainly comprises a child stroller 100 and a seat unit 200.

With reference to the drawings and in particular to FIGS. 1 through 3, and FIG. 14, a child stroller 100 is described here. The type of child stroller 100 in the prior art varies with different folding principle, while all types of child strollers share a common structure including a stroller frame 110, a stroller seat 130 and a safety device 120 used to prevent the child from falling off the stroller seat 130, so that most children strollers can be used in combination with a seat unit.

The seat unit includes a seat frame 210, a connecting means 300 and an operating means 400 mounted on the seat frame 210, the connecting means 300 comprising a first locking member 310 for locking the seat frame 210 into the safety device 120 and a second locking member 320 for locking the seat frame 120 into any device except the child stroller 100, the first locking member 310 being shiftable between the locking position and the unlocking position with the former forming a first working state when the seat unit 200 and the safety device 120 are interconnected and the latter forming another working state permitting the removal of the seat unit 200 from the child stroller 100.

With reference now to the drawings FIGS. 7 through 12, the operating means 400 has control over the first locking member 310 exclusively so that the first locking member 310 is shifted from the locking position into the unlocking position.

Figure 4:
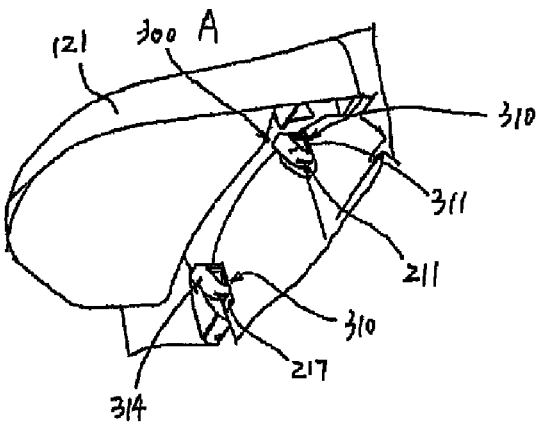
FIG. 4 is the enlarged view of Part A in FIG. 3.
Figure 5:
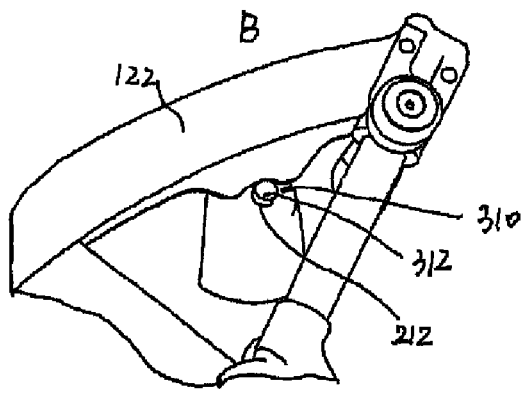
FIG. 5 is the enlarged view of Part B in FIG. 3.
Figure 6:
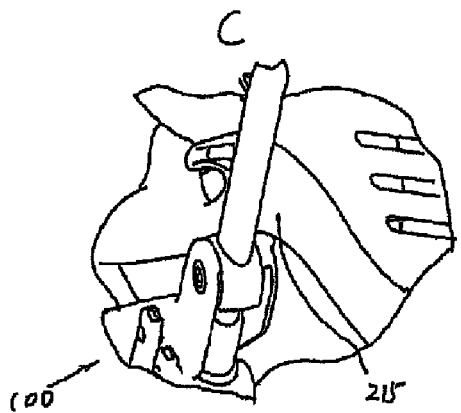
FIG. 6 is the enlarged view of Part C in FIG. 2.
Figure 7:
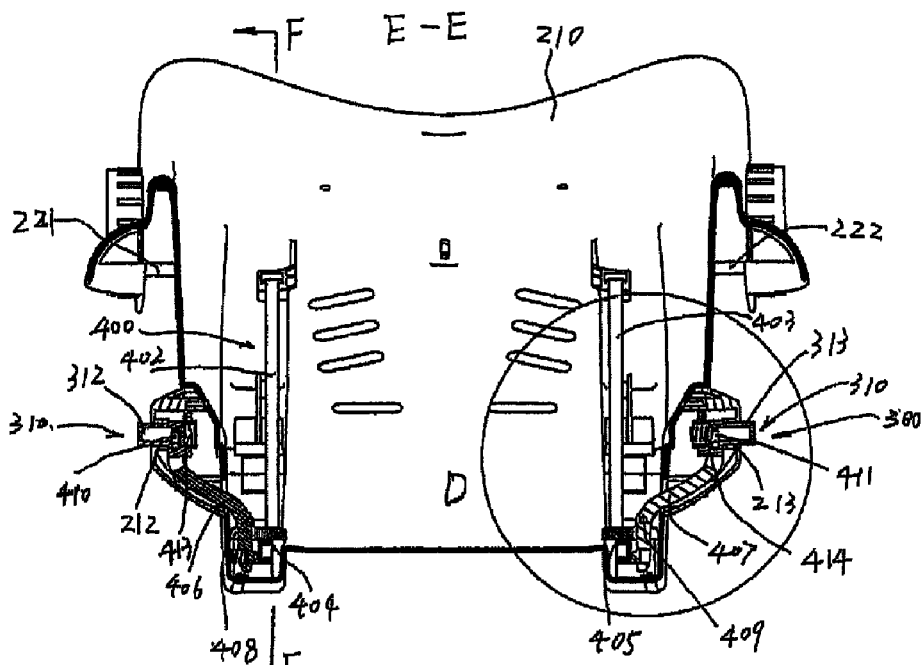
FIG. 7 is a sectional view of FIG. 1 along E-E direction.
Figure 8:
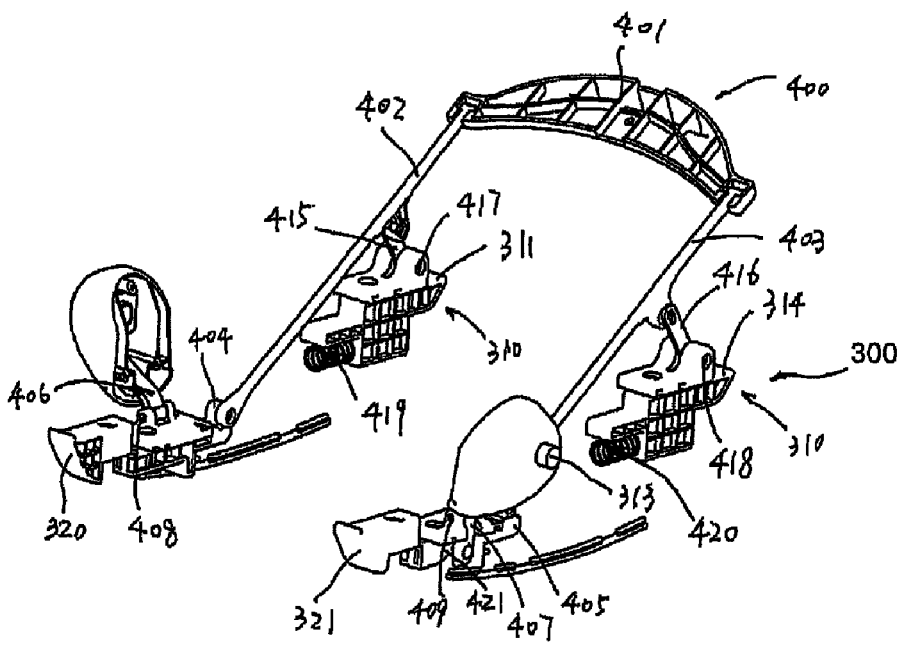
FIG. 8 is one schematic view of the configuration of the connecting means and the operating means.

As shown in FIGS. 1 through 5 and FIGS. 7 through 12, the first locking member 310 includes at least a front locking member 311, a pair of side locking members 312 and 313 set on the left and right side of the seat frame 210 respectively. As shown in FIGS. 4 and 8, the first locking member 310 further includes a front locking member 314. Said safety device 120 includes a front tray 121 or a front arm support set above the front of the stroller seat 130, a left arm support 122 and a right arm support 123 located above the left side and the right side of the stroller seat 130 respectively. When in the locking position, the seat frame 210 is locked into the front tray 121 or the font arm support through the front locking member 311 and 314, at the same time, the two side locking members 312 and 313 locks the seat frame 210 into the left arm support 122 and the right arm support respectively.

With reference to FIG. 8, in the present embodiment, the operating means 400 is set to control the front locking member 311 and 314 and said two side locking members 312 and 313 simultaneously.

With reference to FIG. 4, the foreside of the seat frame 210 possesses two front locking hole 211 and 217 with at least part of the front locking member 311 located in the front locking hole 211 and at least part of the front locking member 314 in the front locking hole 217. When in the locking position, both the front locking member 311 and 314 have a part shooting out of the front locking holes 211 and 217 respectively.

With references to FIGS. 8 through 12, a third spring member 419 is set between the front locking member 311 and the seat frame 210 so that the front locking member 311 is apt to make for the locking position; still a fourth spring member 420 is set between the front locking member 311 and the seat frame 210 so that the front locking member 314 is in tendency for locking position.

With references to FIGS. 8 through 12, as shown in the present embodiment, the front locking member 311 and 314 are set in such a manner that they can slide along the foreside of the seat frame 210, and particularly along the fore-and-aft direction of the seat frame 210. It is also possible that they be set pivotally with respect to the foreside of the seat frame 210.

As just mentioned above, the front locking member 311 and 314 can be set at the foreside of the canvas frame 210 in two different ways, which entails different configurations of the operating means 400. With reference to FIGS. 7 through 12, in the present embodiment, because of the front locking members 311 and 314 included by the first locking member 310, the operating means 400 includes an operating member 401 set on the seat frame 210, a first pulling member 402, a second pulling member 403, a third pole 415 and a fourth pole 416, the operating member 401 can slide on the seat frame 210, the upper end of the two pulling members engaging with the corresponding side of the operating member 401 respectively, the upper end of the two poles are pivotal with respect to the first pulling member 402 and the second pulling member 403 respectively. The body of the third pole 415 is pivotal with respect to the seat frame 210 through the third pivoted axle 417. The body of the fourth pole 416 is pivotal with respect to the seat frame 210 through the fourth pivoted axle 418. The lower end of the third pole 415 presses against the front locking member 311, the lower end of the fourth pole 416 presses against the front locking member 314. As a result, when the operating member 401 is pulled forward, the two front locking members 311 and 314 will be switched to the the unlocking position.

Figure 10:
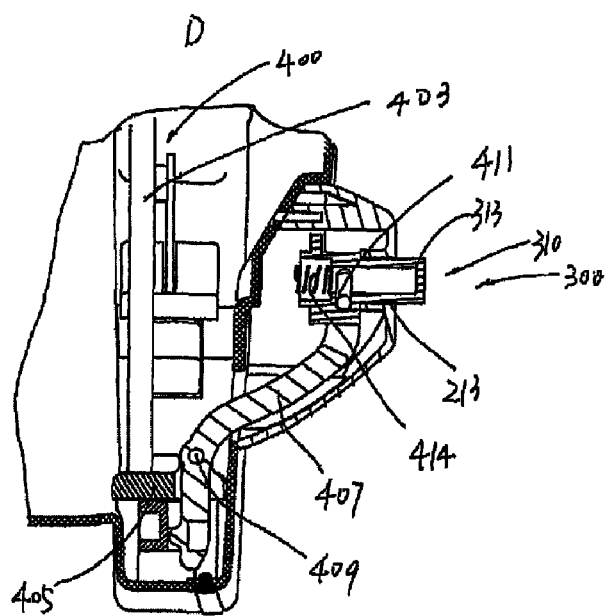
FIG. 10 is the enlarged view of Part D in FIG. 7.
Figure 11:
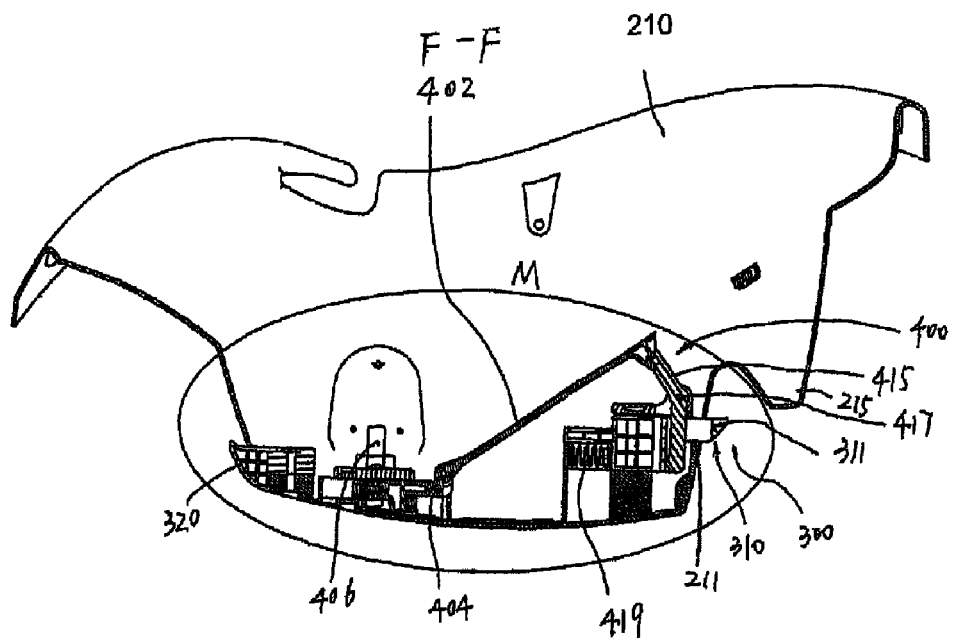
FIG. 11 is a sectional view of FIG. 7 along F-F direction.
Figure 12:
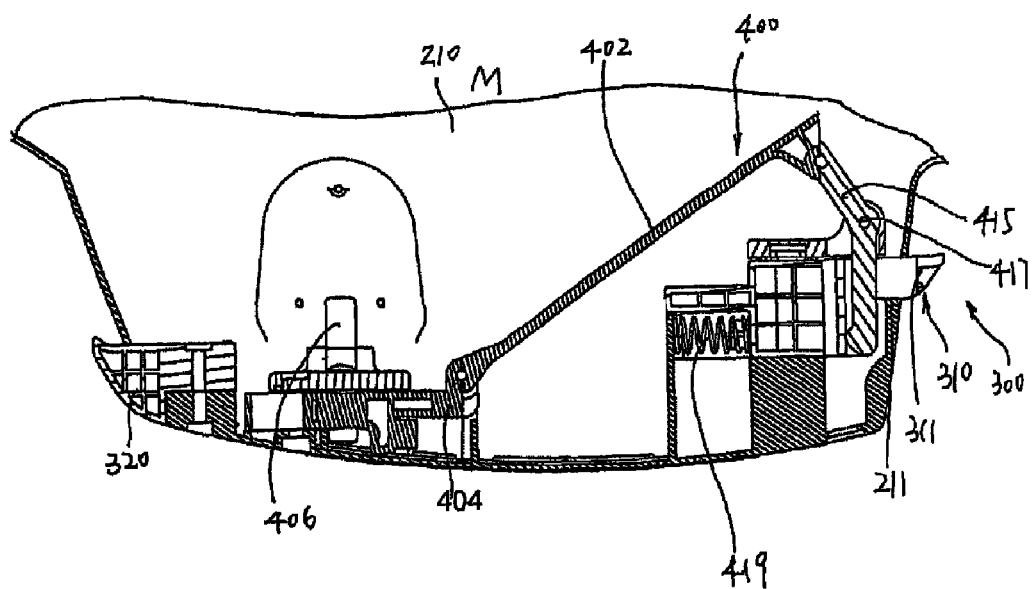
FIG. 12 is the enlarged view of Part M in FIG. 11.
Figure 13:
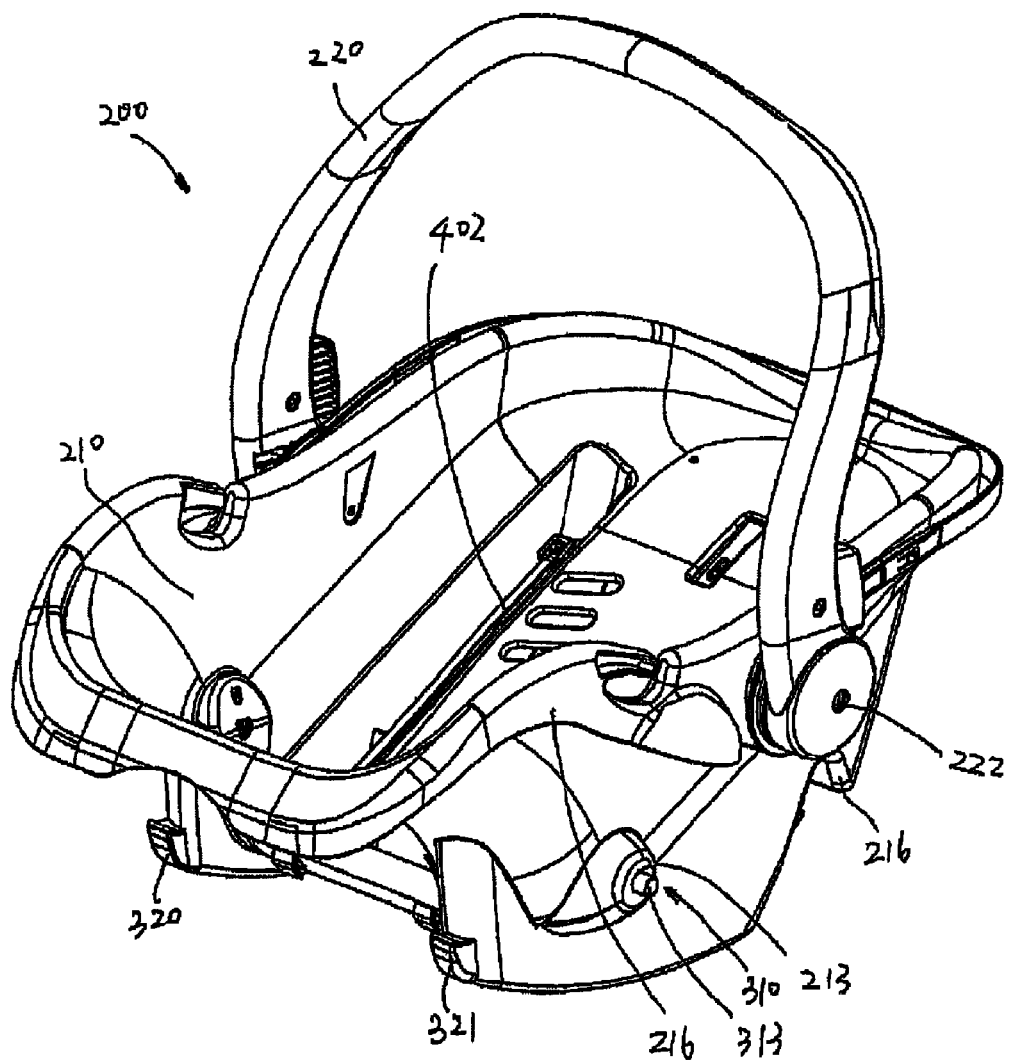
FIG. 13 is a perspective view of the seat unit.
Figure 14:
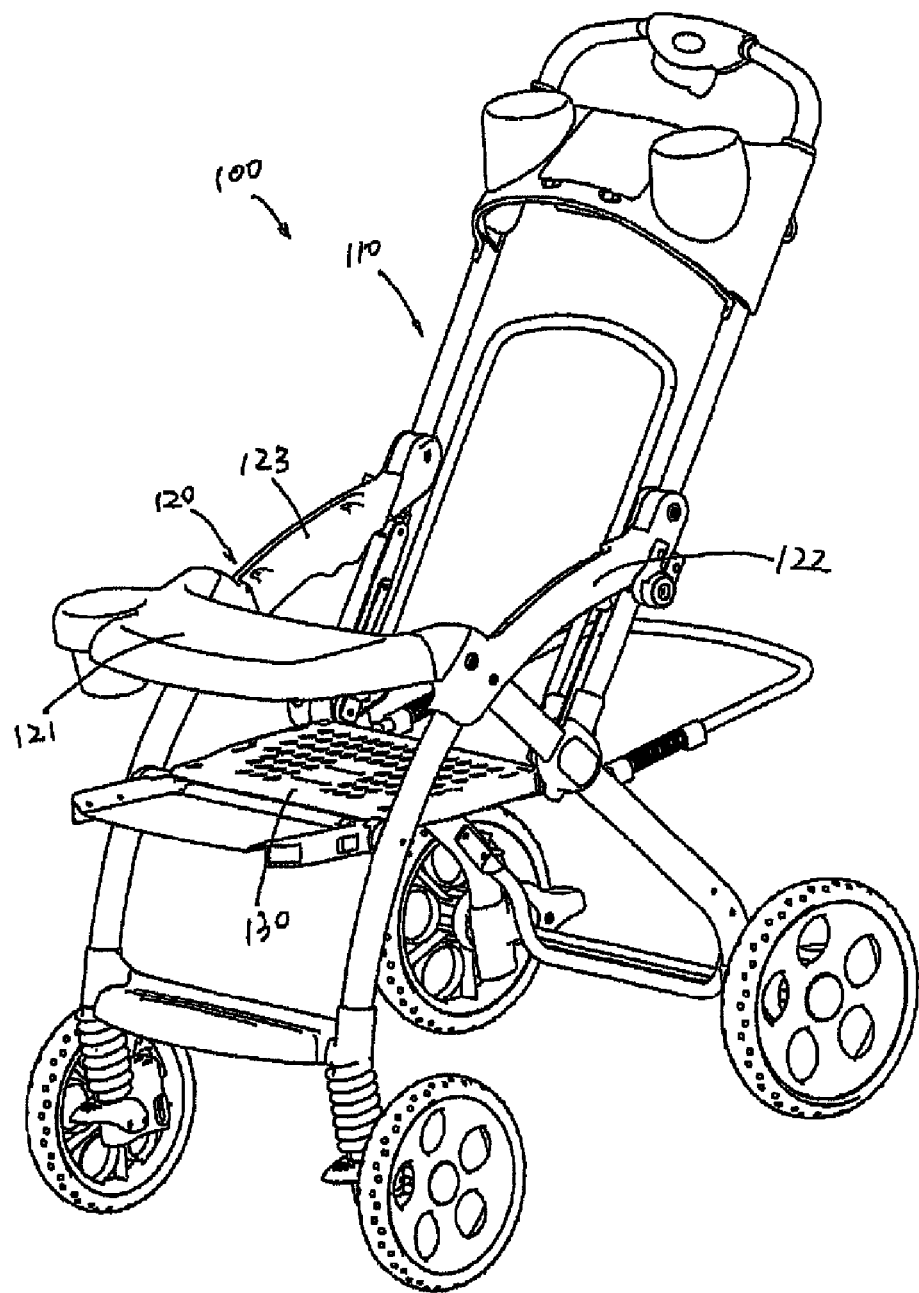
FIG. 14 is a perspective view of the child stroller.

With references to FIGS. 7 and 10, the seat frame 210 is formed with one side locking hole 212 in the left side and one 213 in the right side for accommodating at least part of the side locking member 312 and 313 respectively. In locking position, part of the side locking member 312 and 313 shooting out of the side locking hole 212 and 213 respectively.

With reference to FIGS. 7 to 10, a first spring member 413 is mounted between the side locking member 312 and the seat frame 210, with which the side locking member 312 tends to enter locking position. Also a second spring member 414 is mounted between the side locking member 313 and the seat frame 210 making the side locking member 313 apt to enter locking position.

The two side locking member 312 and 313 can be probably set in such a manner that they can slide on two sides of the canvas frame 210. It is also possible that they are pivotal with respect to two sides of the canvas frame 210. In the present embodiment, the former manner is disclosed and the two side locking members 312 and 313 are particularly slidable along the fore-and-aft direction of the seat frame 210.

Figure 9:
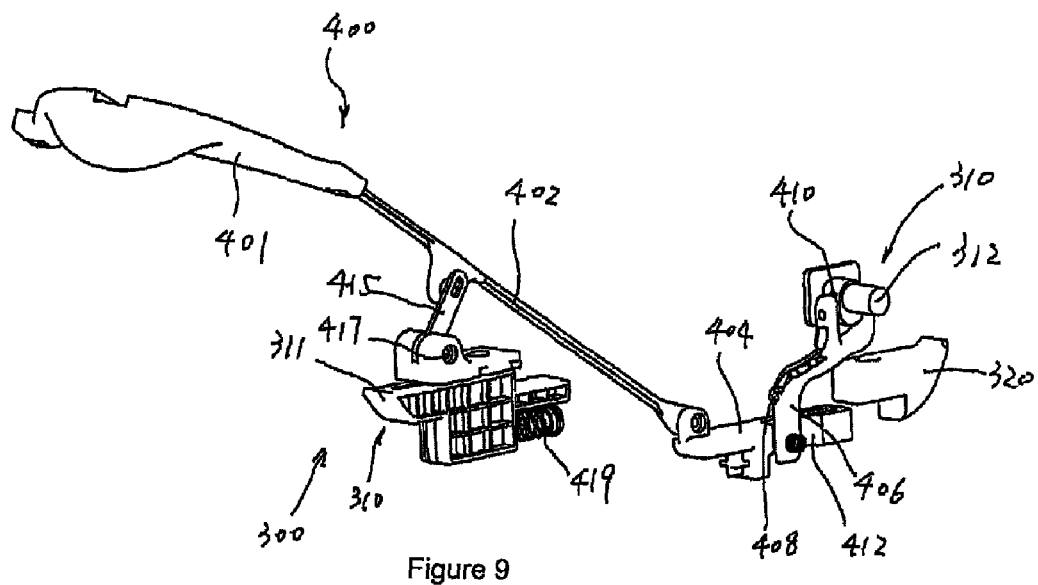
FIG. 9 is another schematic view of the configuration of the connecting means and the operating means.

In this embodiment, the seat frame 210 is formed with only one pair of side locking members 312 and 313. The operating means 400 includes an operating member 401, a first pulling member 402, a second pulling member 403, a first pulling pole 404, a second pulling pole 405, a first pole 406 having a first leading slope 412 and a second pole 407 having a second leading slope 421, the operating member 401 is slidable with respect to the seat frame 210 and its left side and right side engaging with the upper end of the first pulling member 402 and the second pulling member 403 respectively. The front end of the first pulling pole 404, the second pulling pole 405 are pivotally connected with the lower end of the first pulling member 402 and the second pulling member 403 respectively. The first pole 406 and the second pole 407 are pivotal with respect to the seat frame 210 through the first pivoted axle 408 and the second pivoted axle 409 respectively, and the upper end of the first pole 406 is pivotal with respect to the side locking member 312. With reference to FIG. 7, the side locking member 312 is formed with a first flute 410, the extending direction of which is vertical, the upper end of the first pivotal pole 406 is pivotally inserted in the first flute 410. The upper end of the second pole 407 is pivotal with respect to the side locking member 313. With reference now to FIGS. 7 and 10, the side locking member 313 is formed with a second flute 411, the extending direction of which is perpendicular to the horizontal plane. The upper end of the second pole 407 is pivotally inserted in the second flute 411. Refer to FIG. 9, once the operating member 401 is pulled forward, the lower end of the first pole 406 will press against the first leading slope 412, as a result of which, the side locking member 312 will be shifted from the locking position into the unlocking position. Refer to FIG. 8, the lower end of the second pole 407 presses against the second leading slope 421 and the side locking member 313 is in the unlocking position.

Referring to FIGS. 1 to 3, FIGS. 7 to 9 and FIGS. 11 to 13, in both locking and unlocking position, the relative state between the second locking member 320 and the seat frame 210 are identical. The second locking member 320 can probably be fixed to the rearward of the seat frame 210, or in some occasion be movably set at the rearward of the seat frame 210. In any case, the operating means 400 are unable to control the second locking member 320.

Figure 15:
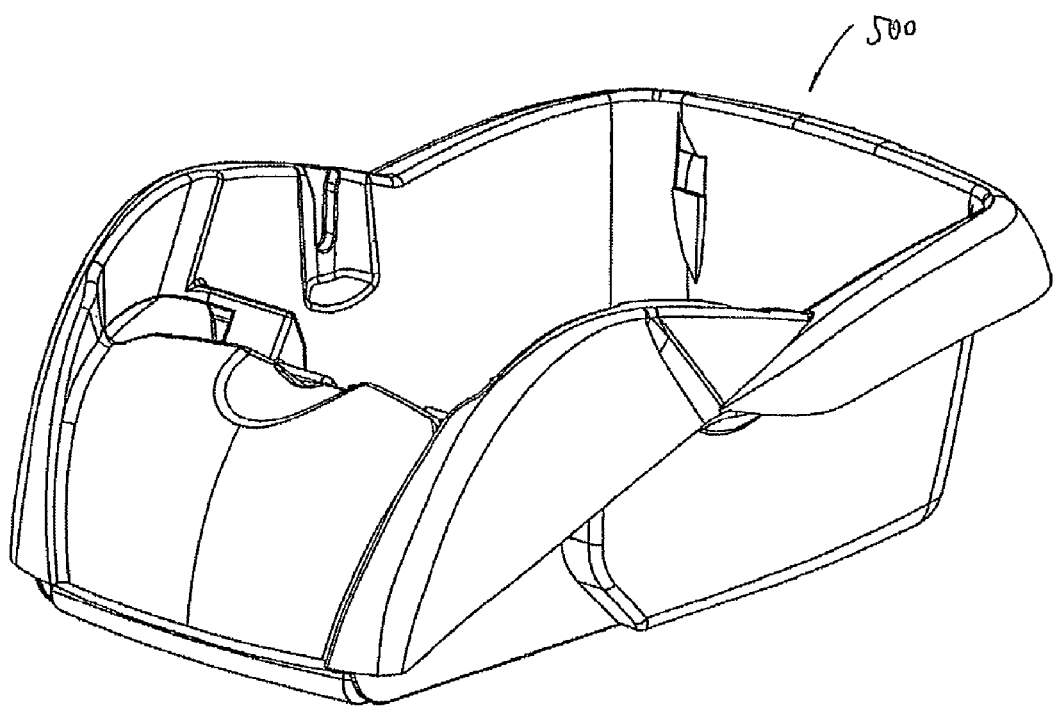
FIG. 15 is a perspective view of the chassis.

The second locking member 320 is used to lock the seat frame 210 to the chassis 500, as can be seen in FIG. 15. The chassis 500 is to be mounted on a car.

The rearward of the seat frame 210 has at least one fixed second locking member 320. Here, the rearward of the seat frame 210 is fixed with two second locking members 320 and 321; the second locking member 321 is also used to lock the seat frame 210 to the chassis 500.

Figure 2:
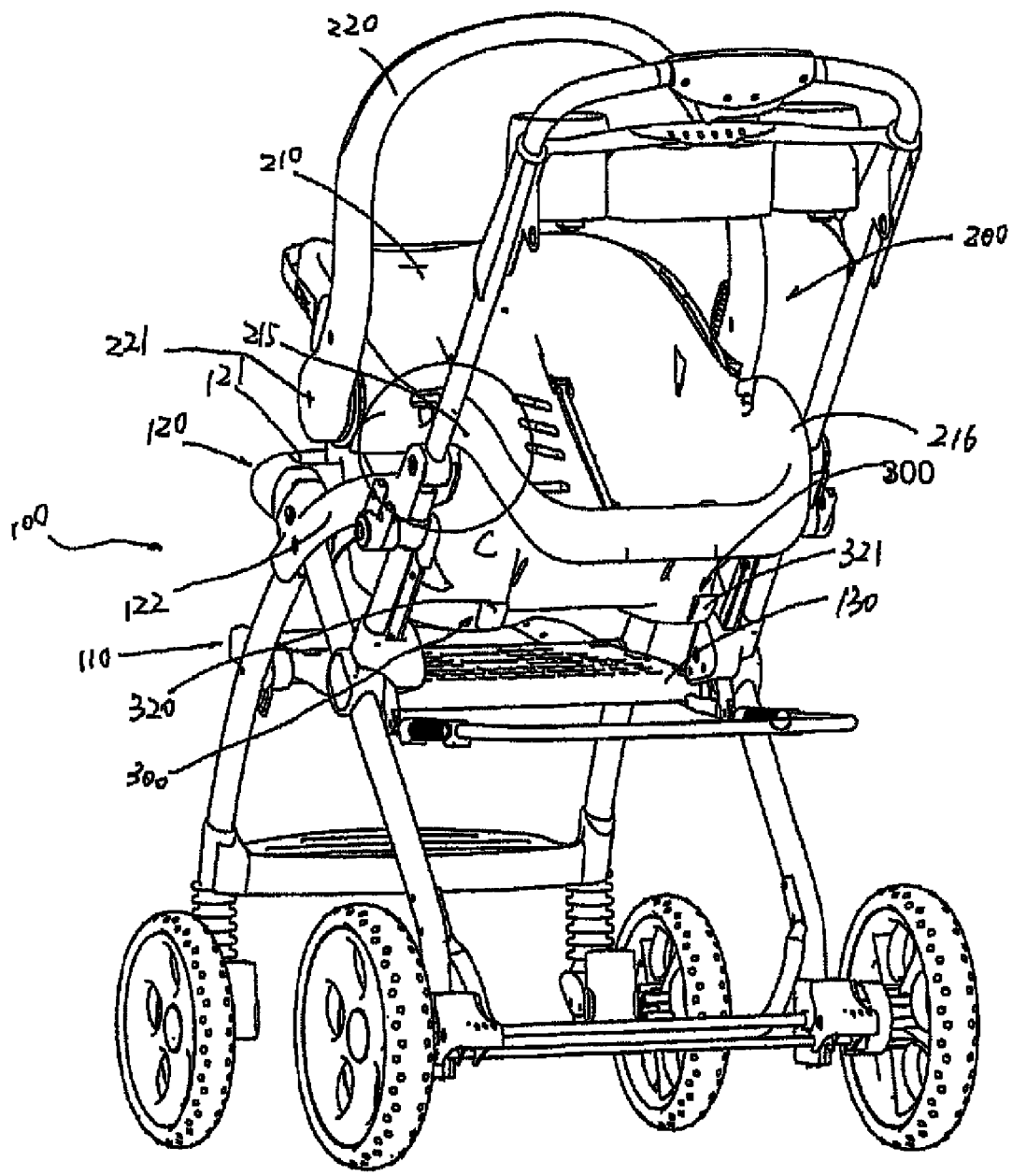
FIG. 2 is one perspective view of the present invention.
Figure 3:
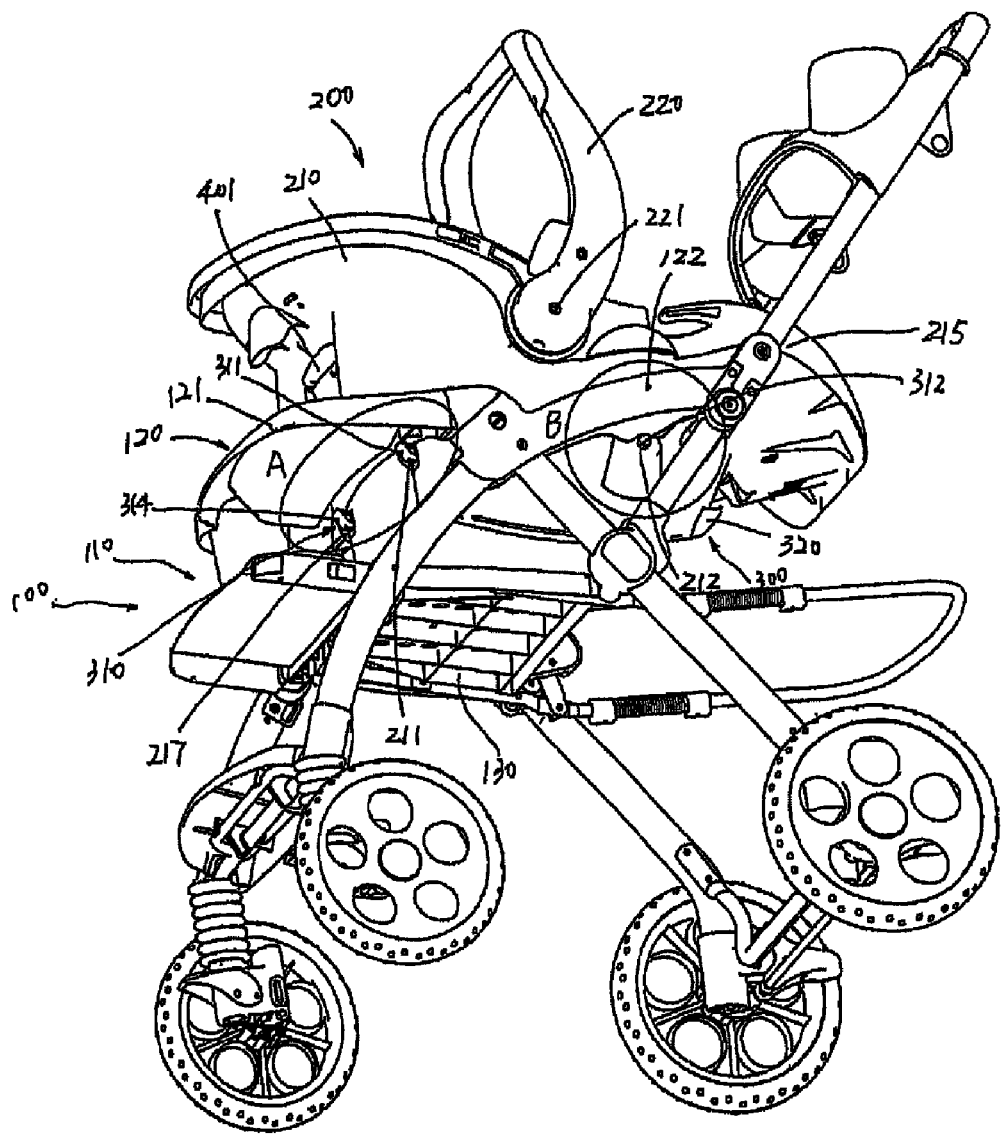
FIG. 3 is another perspective view of the present invention.

With reference to FIGS. 2 and 7, the seat unit 200 further includes a hand grip 220, one end of which is pivotally connected to the left side of the seat frame 210 through the fifth pivoted axle 221, the other end to the right side of the seat frame 210 through the sixth pivoted axle 222.

With reference to FIGS. 1 to 3, FIGS. 11 and 13, for the purpose of ensuring the stability of the connection between the child stroller 100 and the seat unit 200 in locking position, the seat frame 210 is formed with a left contact portion 215 in its left side and a right contact portion 216 in its right side. When in the locking position, the left contact portion 215 and the right contact portion 216 press tightly against the child stroller 100 respectively.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An assembly of seat unit and child stroller comprising:
a child stroller (100) including a stroller frame (110), a stroller seat (130) and a safety device (120) connected to said stroller frame (110) for preventing the child seated on said stroller seat (130) from falling off said stroller seat (130);
a seat unit (200) including a seat frame (210), a connecting means (300) and an operating means (400) mounted on the seat frame (210), said connecting means (300) comprising a first locking member (310) for locking said seat frame (210) into the safety device (120) and a second locking member (320) for locking the seat frame (210) into any device except the child stroller (100), said first locking member (310) being shiftable between a locking status during which the seat unit (200) and the safety device (120) are interconnected, and an unlocking status during which the seat unit (200) can be removed from said child stroller (100); wherein, said operating means (400) is set to control the first locking member (310) only, making the first locking member (310) shift from locking status to unlocking status, said first locking member (310) including at least one front locking member (311) and at least one pair of side locking members (312, 313) lying at the left and right side of the seat frame (210) respectively, and the front locking member (311) and side locking members (312, 313) simultaneously movably controlled by the operating means (400) of said seat unit (200), the front locking member (311) being set on the foreside of said seat frame (210) in the manner of being slidable along a fore-and-aft direction of said seat frame (210), said operating means (400) including an operating member (401) that is slidable with respect to said seat frame (210), a first pulling member (402) with its upper end connected to said operating member (401), and a pole (415) with its upper end rotatably connected to said first pulling member (402), the pole (415) and the seat frame (210) being pivotally connected through a pivoted axle (417), the lower end of said pole (415) pressing tightly against the front locking member (311), which is shifted from locking status to unlocking status when the operating member (401) is pulled forward.

2. The assembly according to claim 1 wherein said safety device (120) includes at least one of a front tray (121) and a front arm support lying above the foreside of said stroller seat (130), a left arm support (122) lying above the left side of said stroller seat (130), and a right arm support (123) lying above the right side of the stroller seat (130), said seat frame (210) being locked into said front tray (121) or said front arm support by said front locking member (311), and into said left arm support (122) and said right arm support (123) by said pair of side locking members (312, 313) respectively in locking status.

3. The assembly according to claim 1 wherein the seat frame (210) is formed with a front locking hole (211) at its foreside for accommodating at least part of said front locking member (311), part of said front locking member (311) shooting out of said front locking hole (211) in the locking status.

4. The assembly according to claim 1 further including a spring member (419) that is mounted between said front locking member (311) and said seat frame (210), with the spring member (419) the front locking member (311) being in tendency for locking status.

5. The assembly according to claim 1 wherein both the left and right side of said seat frame (210) are formed with a side locking hole (212, 213) for accommodating at least part of side locking members (312, 313) respectively, the side locking members (312, 313) each having a part respectively shooting out of the side locking holes (212, 213) in locking status.

6. The assembly according to claim 1 wherein a first spring member (413) and a second spring member (414) are set between said seat frame (210) and the two side locking members (312, 313) respectively, so that both side locking members (312, 313) are in tendency for the locking position.

7. The assembly according to claim 1 wherein side locking members (312, 313) are set on the two sides of said seat frame (210) respectively in the manner that they can slide on said seat frame (210) transversely.

8. The assembly according to claim 1 wherein the second locking member (320) is fixed relative to the seat frame (210).

9. The assembly according to claim 1 wherein the second locking member (320) is used to lock said seat frame (210) into a chassis (500) mounted on a car.

10. The assembly according to claim 1 wherein the seat frame (210) is formed with at least one fixed second locking member (320) at its rearward end.

11. The assembly according to claim 1 wherein the seat unit (200) further comprises a hand grip (220) with one end pivotally connected to the seat frame (210) on left side through a fifth pivoted axle (221) and the other end pivotally connected to the seat frame (210) on right side through a sixth pivoted axle (222).

12. The assembly according to claim 1 wherein the seat frame (210) is formed with a left contact portion (215) on its left side and a right contact portion (215) on its right side, both of which press tightly against the child stroller (100) to ensure a stable connection between the child stroller (100) and seat unit (200) in locking status.

13. An assembly of seat unit and child stroller comprising:
a child stroller (100) including a stroller frame (110), a stroller seat (130) and a safety device (120) connected to said stroller frame (110) for preventing the child seated on said stroller seat (130) from falling off said stroller seat (130);
a seat unit (200) including a seat frame (210), a connecting means (300) and an operating means (400) mounted on the seat frame (210), said connecting means (300) comprising a first locking member (310) for locking said seat frame (210) into the safety device (120) and a second locking member (320) for locking the seat frame (210) into any device except the child stroller (100), said first locking member (310) being shiftable between a locking status during which the seat unit (200) and the safety device (120) are interconnected, and an unlocking status during which the seat unit (200) can be removed from said child stroller (100); wherein,
said operating means (400) is set to control the first locking member (310) only, making the first locking member (310) shift from locking status to unlocking status, said first locking member (310) including at least one front locking member (311) and at least one pair of side locking members (312, 313) lying at the left and right side of the seat frame (210) respectively, and the front locking member (311) and side locking members (312, 313) simultaneously movably controlled by the operating means (400) of said seat unit (200), side locking members (312, 313) are set on the two sides of said seat frame (210) respectively in the manner that they can slide on said seat frame (210) transversely, said operating means (400) including an operating member (401) slidably set with respect to said seat frame (210), a first pulling member (402) with its upper end connected to the left side of said operating member (401), a second pulling member (403) with its upper end connected to the right side of said operating member (401), a first pulling pole (404) with its front end rotatably connected to the lower end of said first pulling member (402), a second pulling pole (405) with its front end rotatably connected to the lower end of the second pulling member (403), a first pole (406) pivotally connected to the seat frame (210) by a first pivoted axle (408), a second pole (407) pivotally connected to said seat frame (210) by a second pivoted axle (409), the first pulling pole (404) having a first leading slope (412) and the second pulling pole (405) having a second leading slope (421), the upper ends of said first pole (406) and said second pole (407) respectively being rotatably connected to said side locking members (312, 313) so that the lower end of said first pole (406) presses tightly against said first leading slope (412) making said locking member (312) shift from the locking status into the unlocking status and the lower end of the second pole (407) presses tightly against the second leading slope (421) making said locking member (313) shift from the locking status into unlocking status.

\* \* \* \* \*